(12) United States Patent
Kim et al.

(10) Patent No.: US 9,395,899 B2
(45) Date of Patent: Jul. 19, 2016

(54) METHOD AND APPARATUS FOR EDITING SCREEN OF MOBILE DEVICE HAVING TOUCH SCREEN

(75) Inventors: Kyu Sung Kim, Seoul (KR); Jee Yeun Wang, Seoul (KR); Yu Sic Kim, Seoul (KR); Hui Chul Yang, Seoul (KR); Joong Hun Kwon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 66 days.

(21) Appl. No.: 13/432,234

(22) Filed: Mar. 28, 2012

(65) Prior Publication Data

US 2012/0304084 A1 Nov. 29, 2012

(30) Foreign Application Priority Data

May 23, 2011 (KR) ........................ 10-2011-0048301

(51) Int. Cl.
G06F 3/0486 (2013.01)
G06F 3/0488 (2013.01)
G06F 3/0483 (2013.01)
G06F 3/0481 (2013.01)

(52) U.S. Cl.
CPC ............ *G06F 3/0486* (2013.01); *G06F 3/0483* (2013.01); *G06F 3/0488* (2013.01); *G06F 3/04817* (2013.01); *G06F 3/04883* (2013.01)

(58) Field of Classification Search
CPC . G06F 3/0486; G06F 3/04817; G06F 3/0488; G06F 3/0482; G06F 3/0483; H04M 2250/22; H04M 1/72583
USPC ......... 715/762, 761, 769, 810, 826, 815, 835, 715/747
See application file for complete search history.

(56) References Cited

U.S. PATENT DOCUMENTS

| | | | |
|---|---|---|---|
| 5,754,178 A * | 5/1998 | Johnston, Jr. | ......... G06F 9/4443 715/769 |
| 8,266,550 B1 * | 9/2012 | Cleron et al. | ................. 715/863 |
| 8,281,241 B2 * | 10/2012 | Tokkonen | ..................... 715/708 |
| 8,386,950 B2 * | 2/2013 | Henderson | ..................... 715/769 |
| 8,407,613 B2 * | 3/2013 | Hope | ............................ 715/769 |

(Continued)

FOREIGN PATENT DOCUMENTS

| | | |
|---|---|---|
| CN | 102033710 A | 4/2011 |
| JP | 2012-527684 A | 11/2012 |

(Continued)

OTHER PUBLICATIONS

WO2011/037222A1 English Machine Translation, Created Nov. 19, 2014 by Examiner.*

(Continued)

*Primary Examiner* — Nicholas Ulrich
(74) *Attorney, Agent, or Firm* — Cha & Reiter, LLC

(57) ABSTRACT

A method and an apparatus for editing a screen of a mobile device having a touch screen. In an idle mode, the mobile device displays an item display region containing at least one item on an idle screen. In an edit mode, the mobile device displays an edit command region containing at least one predetermined edit command on an edit screen. When a first item contained in the item display region is moved to the edit command region, the mobile device executes the predetermined edit command assigned to a moved position of the edit command region.

16 Claims, 11 Drawing Sheets

(56) References Cited

U.S. PATENT DOCUMENTS

| | | | |
|---|---|---|---|
| 8,458,615 B2* | 6/2013 | Chaudhri | 715/803 |
| 8,661,369 B2* | 2/2014 | Heo et al. | 715/864 |
| 8,669,953 B2* | 3/2014 | Kim et al. | 345/173 |
| 2002/0057292 A1* | 5/2002 | Holtz | 345/769 |
| 2008/0059893 A1 | 3/2008 | Byrne et al. | |
| 2008/0155481 A1* | 6/2008 | Kim et al. | 715/867 |
| 2008/0313568 A1* | 12/2008 | Park et al. | 715/835 |
| 2009/0058821 A1 | 3/2009 | Chaudhri et al. | |
| 2009/0083655 A1 | 3/2009 | Beharie et al. | |
| 2009/0187842 A1* | 7/2009 | Collins et al. | 715/769 |
| 2010/0088597 A1 | 4/2010 | Shin et al. | |
| 2010/0192105 A1 | 7/2010 | Kim et al. | |
| 2010/0295789 A1* | 11/2010 | Shin et al. | 345/168 |
| 2011/0041086 A1 | 2/2011 | Kim et al. | |
| 2011/0061010 A1 | 3/2011 | Wasko | |
| 2011/0061019 A1* | 3/2011 | Clift | G06F 9/4443 715/790 |
| 2011/0161852 A1* | 6/2011 | Vainio et al. | 715/769 |
| 2011/0209080 A1* | 8/2011 | Bamford et al. | 715/769 |
| 2011/0252346 A1 | 10/2011 | Chaudhri | |
| 2011/0252350 A1* | 10/2011 | Chaudhri | 715/769 |
| 2011/0252375 A1* | 10/2011 | Chaudhri | 715/835 |
| 2011/0296339 A1* | 12/2011 | Kang | 715/782 |
| 2012/0084692 A1* | 4/2012 | Bae | 715/769 |
| 2012/0084732 A1* | 4/2012 | Filippov et al. | 715/838 |
| 2014/0006990 A1* | 1/2014 | Harada et al. | 715/769 |

FOREIGN PATENT DOCUMENTS

| | | |
|---|---|---|
| JP | 2013-525878 A | 6/2013 |
| KR | 10-2003-0048946 A | 6/2003 |
| WO | 2010/134718 A2 | 11/2010 |
| WO | WO2011/037222 A1 * | 3/2011 |
| WO | 2011/126501 A1 | 10/2011 |

OTHER PUBLICATIONS

Use iTunes to Arrange Apps on Your iPhone Screen MacTips—Top Tips and Tricks for Mac, IOS, Ipad, Iphone and Everything Apple, XP055203606, Oct. 14, 2009.
Japanese Search Report, dated Mar. 8, 2016.

* cited by examiner

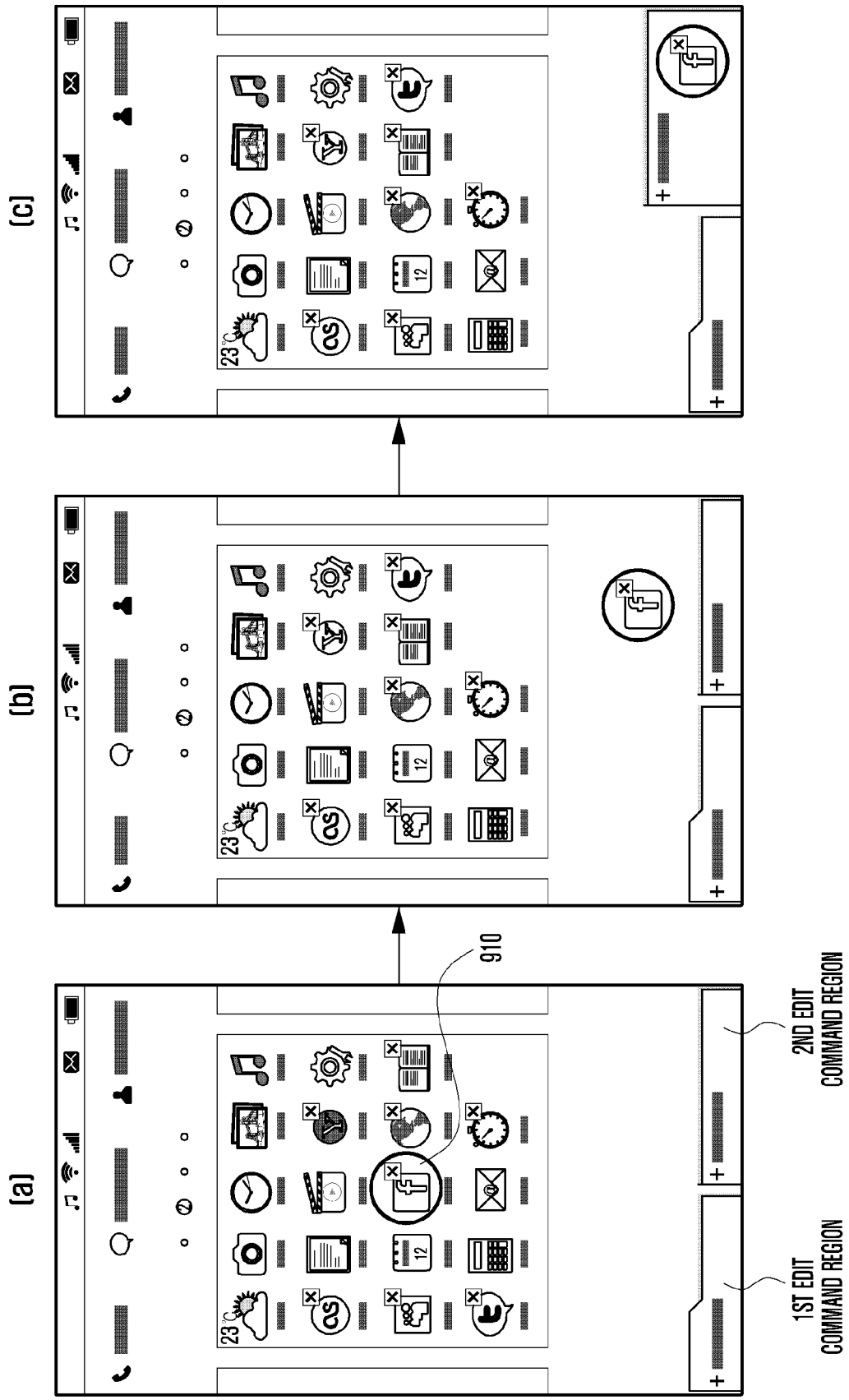

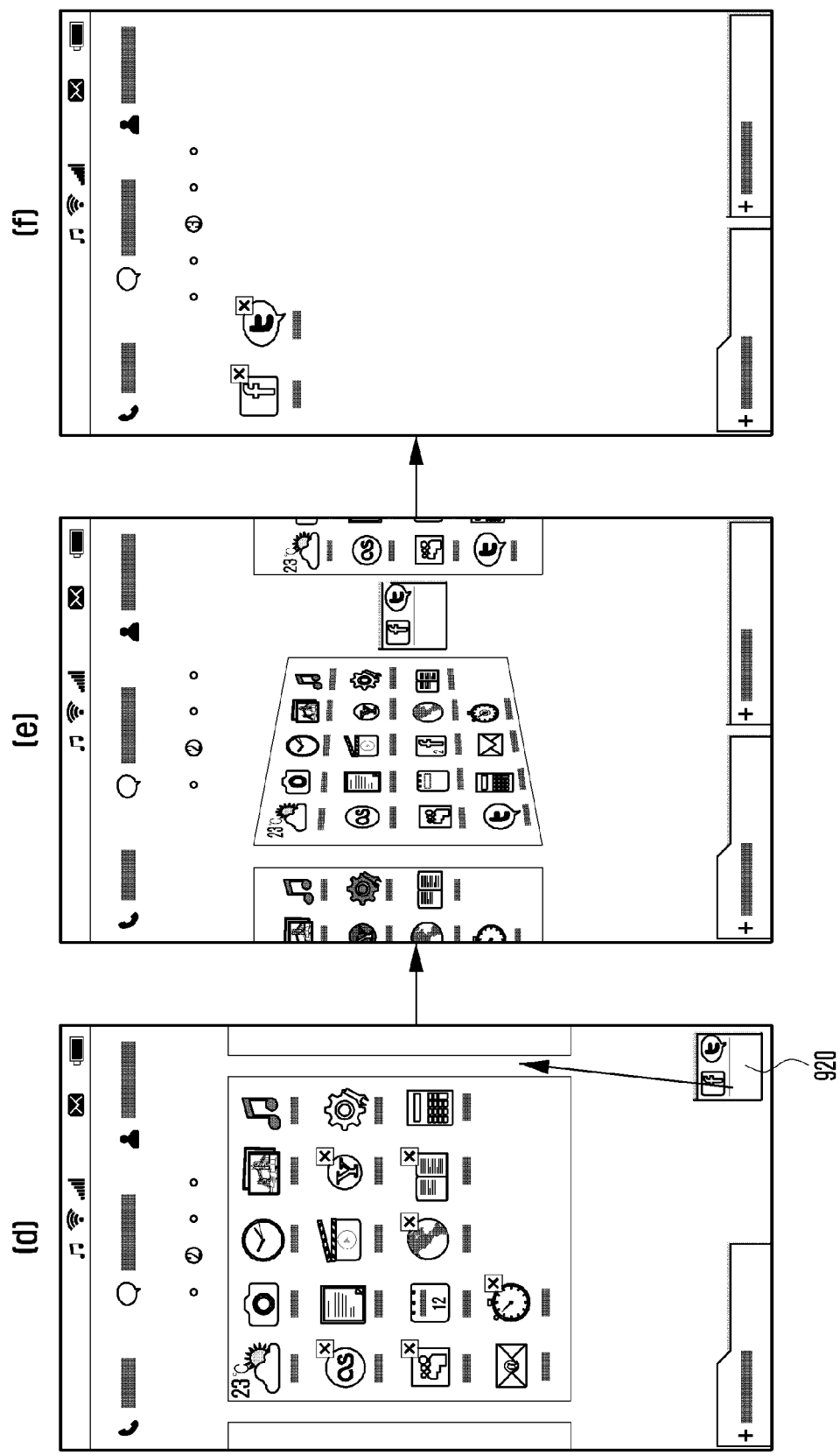

METHOD AND APPARATUS FOR EDITING SCREEN OF MOBILE DEVICE HAVING TOUCH SCREEN

CLAIM OF PRIORITY

This application claims priority from Korean Patent Application No. 10-2011-0048301 filed in the Korean Intellectual Property Office on May 23, 2011, the contents of which are hereby incorporated by reference in its entirety.

BACKGROUND OF THE INVENTION

1. Field of the Invention

The present invention relates in general to screen edit technology for mobile devices. More particularly, the present invention relates to a method and an apparatus for executing a predetermined edit command assigned to a specific edit command region of a screen when any item moves to the region in an edit mode.

2. Description of the Related Art

With remarkable growth of related communication technologies, many kinds of mobile devices have become increasingly popular in recent days. Today's mobile devices offer a great variety of additional services such as e-book, music, gallery, movie, game, scheduler, etc., thus evolving into multimedia communication devices. To meet this evolution into multimedia communication devices, a user interface suitable for conveniently managing and using various additional services is required.

A conventional process for creating a new folder, etc. in editing a main screen, or a home screen, of the mobile device is as follows. The main screen comprises a screen basically offered by the mobile device, and the home screen is a screen edited by a user on the basis of the main screen.

A user enters into an edit mode typically by using a long press, etc., and then selects a folder creation menu by making long presses along any unused screen space of the mobile device. If a user wants to move any item to a created folder, the user selects and drags a desired icon and drops it on the created folder. Also, if a user wants to move the created folder to any other page, he or she typically drag the folder to a desired page while continuously long pressing the folder.

Unfortunately, this conventional process of folder creation and movement of items to other folders is complicated since it needs several steps. Such problems generally exist not only in the folder creation process, but in any other of the screen edit processes associated therewith.

BRIEF SUMMARY OF THE INVENTION

Accordingly, the present invention addresses at least in part some of the above-mentioned problems and/or disadvantages and offers at least the advantages described below.

An exemplary aspect of the present invention is to provide a method and an apparatus for executing a predetermined edit command assigned to a specific edit command region of a display screen of a mobile device when any item moves to the edit command region in an edit mode.

According to one exemplary aspect of the present invention, a method for editing a touch screen of a mobile device preferably comprises: in an idle mode, displaying on an idle screen an item display region containing at least one item; in an edit mode, displaying an edit command region containing at least one predetermined edit command on an edit screen; and when a first item contained in the item display region is moved to the edit command region, executing the predetermined edit command assigned to a moved position of the edit command region.

According to another exemplary aspect of the present invention, provided is an apparatus for editing a screen of a mobile device, the apparatus preferably comprising: a touch screen unit configured to, display an item display region containing at least one item on an idle screen in an idle mode, and when in an edit mode, display an edit command region containing at least one predetermined edit command on an edit screen; and a control unit configured to, when a first item contained in the item display region is moved to the edit command region, execute the predetermined edit command assigned to a moved position of the edit command region.

According to other exemplary aspects of the present invention, the mobile device can execute a predetermined edit command assigned to a specific edit command region when any item moves to the region in an edit mode more simply than known heretofore. Therefore, in the edit mode, the creation of a new folder and the transfer of an item to such a folder can be performed simultaneously through a user's simple manipulation. Additionally, a user can easily move a created folder to a desired page through a sweep action. A page creation process has the same advantages. A user can collect desired items in a new page and add such a page at a time.

Other exemplary aspects, advantages, and salient features of the invention will become apparent to those of ordinary skill in the art from the following detailed description, which, taken in conjunction with the annexed drawings, discloses exemplary embodiments of the invention.

BRIEF DESCRIPTION OF THE DRAWINGS

FIG. 9 is a screenshot illustrating examples of an idle screen and an edit screen displayed in a mobile device in the page creation process shown in FIG. 8.

DETAILED DESCRIPTION

Exemplary, non-limiting embodiments of the present invention will now be described more fully with reference to the accompanying drawings. The presently claimed invention may, however, be embodied in many different forms and should not be construed as limited to the exemplary embodiments set forth herein. Rather, the disclosed embodiments are provided so that this disclosure will be understood by a person of ordinary skill in the art so as to be practiced without undue experimentation. The principles and features of this invention may be employed in varied and numerous exemplary embodiments without departing from the spirit of the invention and the scope of the appended claims.

Furthermore, well known or widely used techniques, elements, structures, and processes may not be described or illustrated in detail to avoid obscuring appreciation of the present invention by a person of ordinary skill in the art. Although the drawings represent exemplary embodiments of the invention, the drawings are not necessarily to scale and certain features may be exaggerated, diminished or omitted in order to better illustrate and explain salient features of the present invention.

Among terms set forth herein, an item refers to a unit for identifying or executing an application, a folder, a widget, and the like. Such items may be represented with various shapes, colors, and their combinations.

Figure 1:
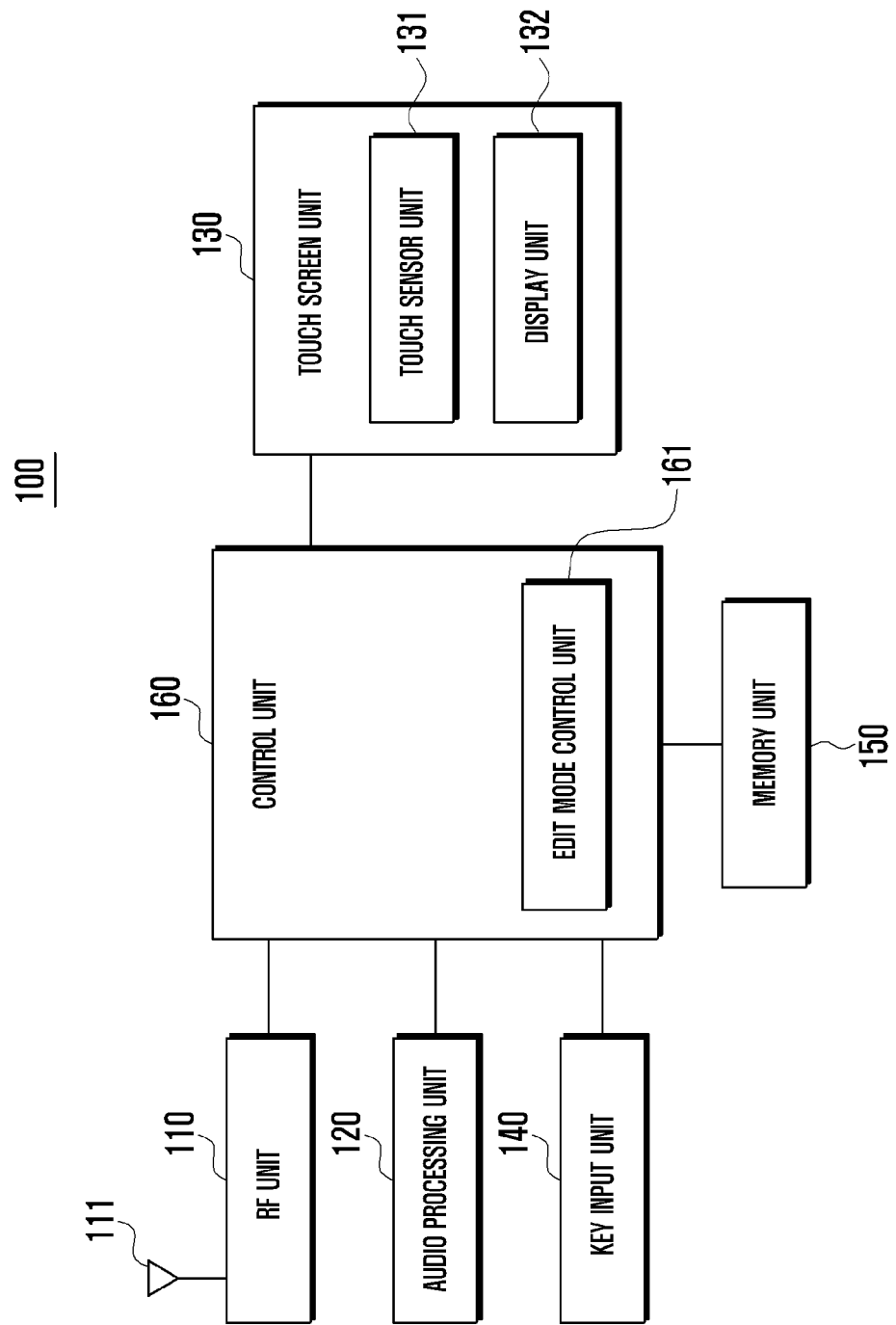
FIG. 1 is a block diagram illustrating an example of an internal structure of a mobile device in accordance with an exemplary embodiment of the present invention.

FIG. 1 is a block diagram illustrating one possible example of an internal structure of a mobile device in accordance with an exemplary embodiment of the present invention. As shown in FIG. 1, the mobile device 100 according to this exemplary embodiment may preferably include a radio frequency (RF) unit 110, an audio processing unit 120, a touch screen unit 130, a key input unit 140, a memory unit 150, and a control unit 160.

The RF unit 110 performs a function to transmit and receive data for wireless communication of the mobile device 100, typical by at least one antenna 111. Normally the RF unit 110 may include an RF transmitter that up-converts the frequency of an outgoing signal and then amplifies the signal, an RF receiver that amplifies with low-noise an incoming signal and down-converts the frequency of the signal, and the like. Additionally, the RF unit 110 may receive data through a wireless channel and then output it to the control unit 160, and also receive data from the control unit 160 and then transmit it through a wireless channel.

The audio processing unit 120 may include a codec that can be comprised of a data codec for processing packet data and an audio codec for processing an audio signal such as a voice. The audio processing unit 120 converts a digital audio signal into an analog audio signal through the audio codec and then outputs the analog audio signal through a speaker (SPK). Conversely, the audio processing unit 12 converts an analog audio signal received from a microphone (MIC) into a digital audio signal through the audio codec.

The touch screen unit 130 preferably includes a touch sensor unit 131 and a display unit 132. The touch sensor unit 131 detects a user's touch or stylus input. The touch sensor unit 131 may be formed of touch detection sensors of capacitive overlay type, resistive overlay type or infrared beam type, or formed of pressure detection sensors, just to name some possible types of construction. Alternatively, any other of the various types of sensors capable of detecting a contact or pressure of an object may be used for the touch sensor unit 131. The touch sensor unit 131 detects a user's touch input, creates a detection signal, and transmits the signal to the control unit 160. The detection signal contains coordinate data of a user's touch input. If a touch and moving gesture is inputted by a user, the touch sensor unit 131 creates a detection signal containing coordinate data about a moving path of a touched point and then transmits the detection signal to the control unit 160.

Particularly, in exemplary embodiments of this invention, the touch sensor unit 131 may detect a user's input for entering into an edit mode from an idle mode. For instance, such a user's input may be a touch (including a multi-touch), a long press, a drag, or the like.

The display unit 132 may be formed of a Liquid Crystal Display (LCD), Organic Light Emitting Diode (OLED), Active Matrix OLED (AMOLED), any equivalent thereof, or any other type of thin film technology screen. The display unit 132 visually offers display of a menu, input data, function setting information and any other various information of the mobile device 100 to a user. The display unit 132 outputs display of a booting screen, an idle screen, a menu screen, a call screen, or any other application screens of the mobile device 100.

Although the mobile device 100 of the present invention preferably includes the touch screen unit 130 as discussed above, this arrangement is exemplary only and not to be considered as a limitation of the presently claimed invention. Alternatively, the invention may be applied to any kind of device, mobile or otherwise, and devices that do not have a touch screen. In such cases, the touch screen unit 130 shown in FIG. 1 may be replaced by the display unit 132 only.

With continued reference to FIG. 1, the key input unit 140 receives a user's key manipulation for the control of the mobile device 100, creates a corresponding input signal, and then delivers the input signal to the control unit 160. The key input unit 140 may be formed of a keypad having alphanumeric keys and navigation keys and disposed at the front side of the mobile device 100, and some function keys disposed at lateral sides of the mobile device 100. If the touch screen unit 130 includes keys that include the functionality of the key input in order to manipulate the mobile device, then the key input unit 140 is optional and may be omitted.

The memory unit 150 comprises a non-transitory machine readable medium, and is used to store programs and data required for operations of the mobile device 100 and may consist of a program region and a data region. The program region may store machine executable code comprising an operating system (OS) and other programs for booting and operating the mobile device 100, as well as applications required for the playback of multimedia contents, and applications required for the execution of various optional functions of the mobile device 100. Such optional functions included but are not limited to a camera function, a sound reproduction function, an image or video playback function, and the like. The data region stores data created while the mobile device 100 is used, such as an image, a video, a phonebook, audio, etc.

The control unit 160, which preferably comprises a processor or microprocessor, controls the whole operation of the mobile device 100, and may control other processing by units in communication therewith, such as audio processing by the audio processing unit. Particularly, when the mobile device 100 enters into an edit mode and when any item is moved or moves to a specific edit command region, the control unit 160 may control a series of steps for executing a predetermined edit command assigned to the region. For this, the control unit 160 may have an edit mode control unit 161.

Figure 2:
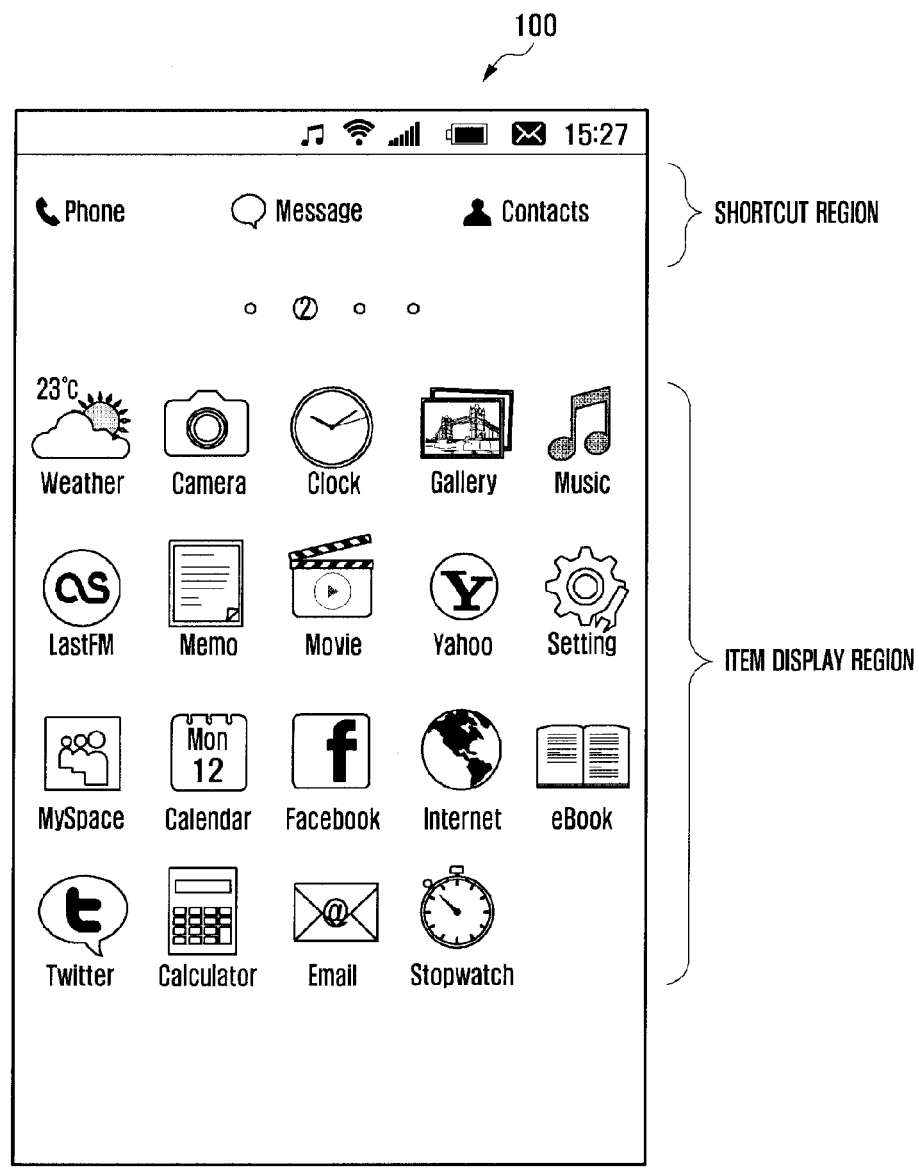
FIG. 2 is a screenshot illustrating an example of an idle screen displayed in a mobile device in accordance with an exemplary embodiment of the present invention.
Figure 3:
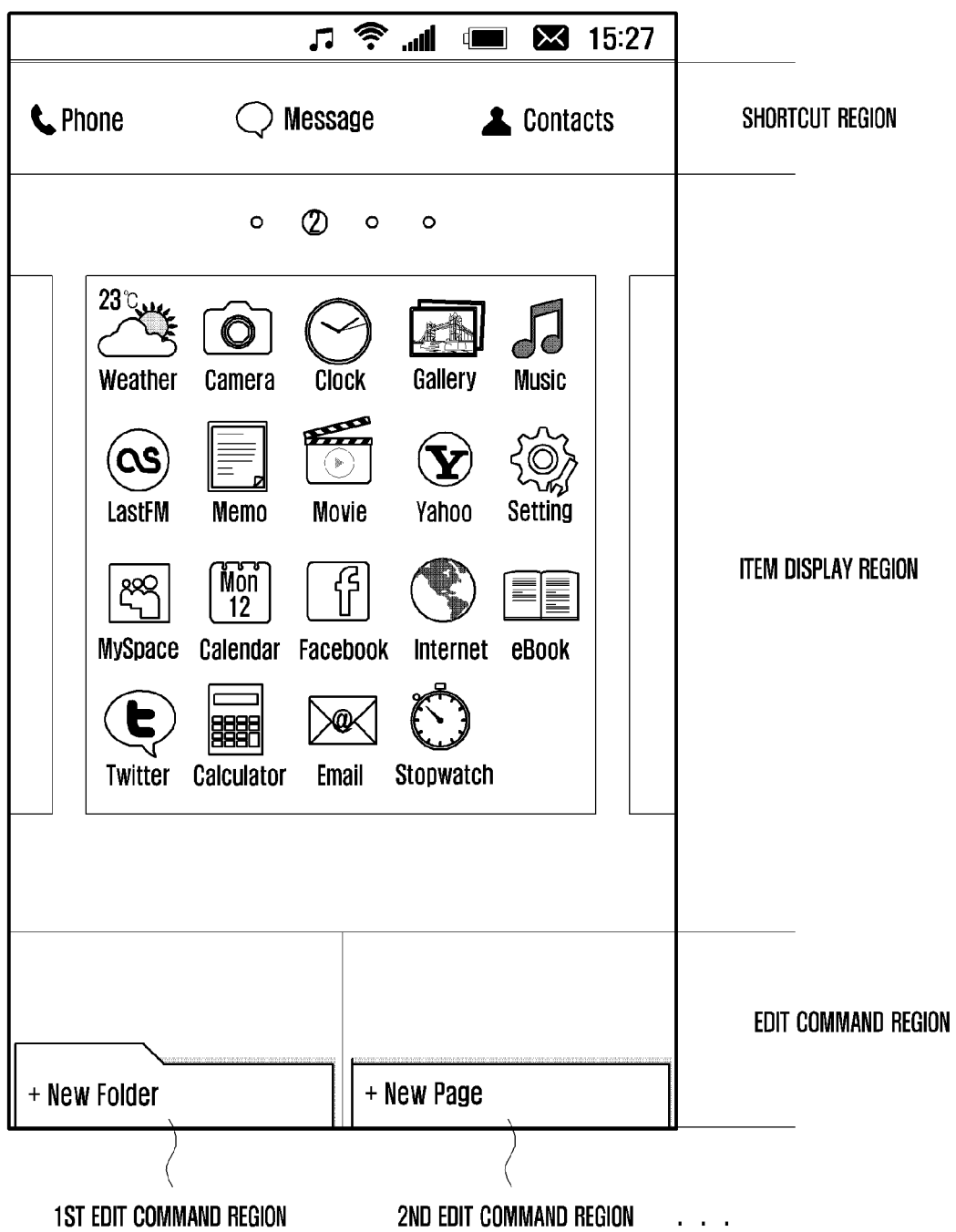
FIG. 3 is a screenshot illustrating one possible example of an edit screen displayed in a mobile device in accordance with an exemplary embodiment of the present invention.

With reference to FIGS. 2 and 3, the edit mode control unit 161 will now be described. FIG. 2 is a screenshot illustrating one possible example of an arrangement of an idle screen displayed in a mobile device in accordance with an exemplary embodiment of the present invention. FIG. 3 is a screenshot illustrating one possible example of an edit screen displayed in a mobile device in accordance with an exemplary embodiment of the present invention.

In the exemplary edit mode of the mobile device 100 shown in FIG. 2, the edit mode control unit 161 (FIG. 1) controls a display of the idle screen. In an exemplary embodiment of this invention, the idle screen may contain a shortcut region and an item display region. The shortcut region has at least one item for directly performing a particular function. The shortcut region is optionally displayed in the idle screen, depending on exemplary embodiments of this invention, and is not always contained in the idle screen.

The item display region may display at least one item. As mentioned above, the "item" refers to a unit for identifying or executing an application, a folder, a widget, and the like. When one of such items is selected, a particular function assigned to the selected item is performed.

Meanwhile, when entering into the edit mode from the idle mode, the edit mode control unit 161 controls a display of the edit screen as shown in the example of FIG. 3. In an exemplary embodiment of this invention, the edit screen may contain the shortcut region, the item display region, and an edit command region.

The shortcut region in this particular example is the same as discussed above in FIG. 2.

In the edit mode, the edit mode control unit 161 reduces an icon size of each item displayed in the item display region. At the same time, the edit mode control unit 161 rearranges the item display region by means of page frames displays. Namely, under the control of the edit mode control unit 161, a current page frame is displayed together with a right part of a left page frame and a left part of a right page frame. Also, the edit mode control unit 161 may further display a certain identifier adjacent to editable items in order to distinguish them from the others.

Additionally, in the edit mode, the edit mode control unit 161 may control the edit command region to be displayed in a part of the edit screen. In FIG. 3, the edit command region is displayed in the lower part of the edit screen, as one possible example, but is not limited to display in any one particular part of the edit screen. The edit command region may be divided into a plurality of regions or sub-regions, such as the first edit command region, the second edit command region, etc., to which predetermined edit commands are assigned respectively. For instance, a folder creation command may be assigned to the first edit command region, and a page creation command may be assigned to the second edit command region.

When any item displayed in the item display region is moved to the edit command region, the edit mode control unit 161 recognizes the item and executes a predetermined edit command assigned to the edit command region. If a particular item is located in the first edit command region corresponding to a folder creation command, the edit mode control unit 161 starts to perform a folder creation process. Similarly, if a particular item is located in the second edit command region corresponding to a page creation command, the edit mode control unit 161 starts to perform a page creation process. These processes will now be described herein below.

Although in the above exemplary embodiment a folder creation command and a page creation command are assigned respectively to the first and second edit command regions, this is exemplary only and not to be considered as a limitation of the presently claimed invention. Alternatively, any other various edit commands may be assigned to a plurality of edit command regions.

Although the edit mode control unit 161 is illustrated as a distinct block performing distinct functions in comparison with the control unit 160, this is exemplary only and both units do not have to be physically or logically distinct from each other. Alternatively, some functions of the edit mode control unit 161 may be performed by the control unit 160.

Figure 4:
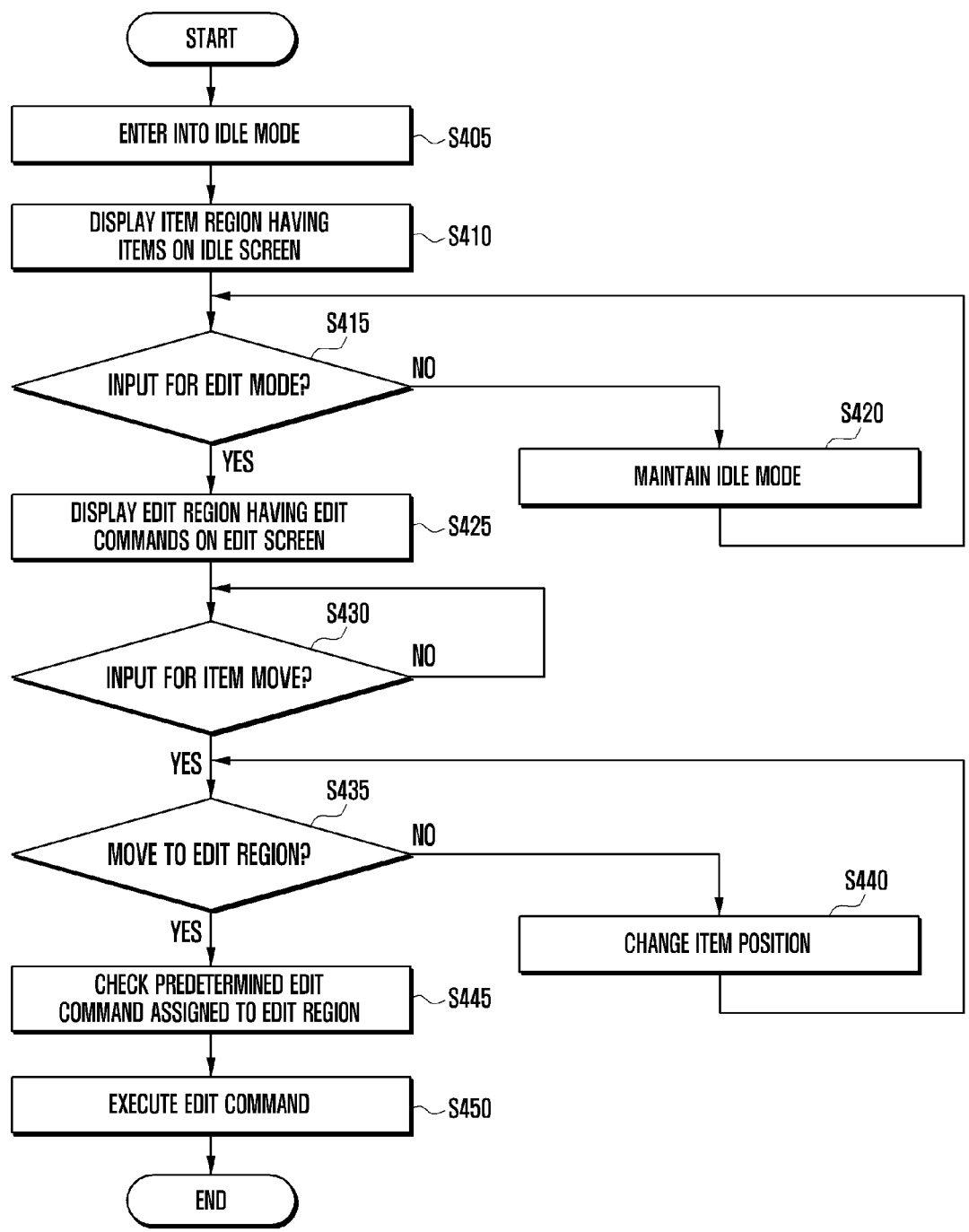
FIG. 4 is a flow diagram illustrating exemplary operation of a method for editing a screen of a mobile device in accordance with an exemplary embodiment of the present invention.
Figure 5:
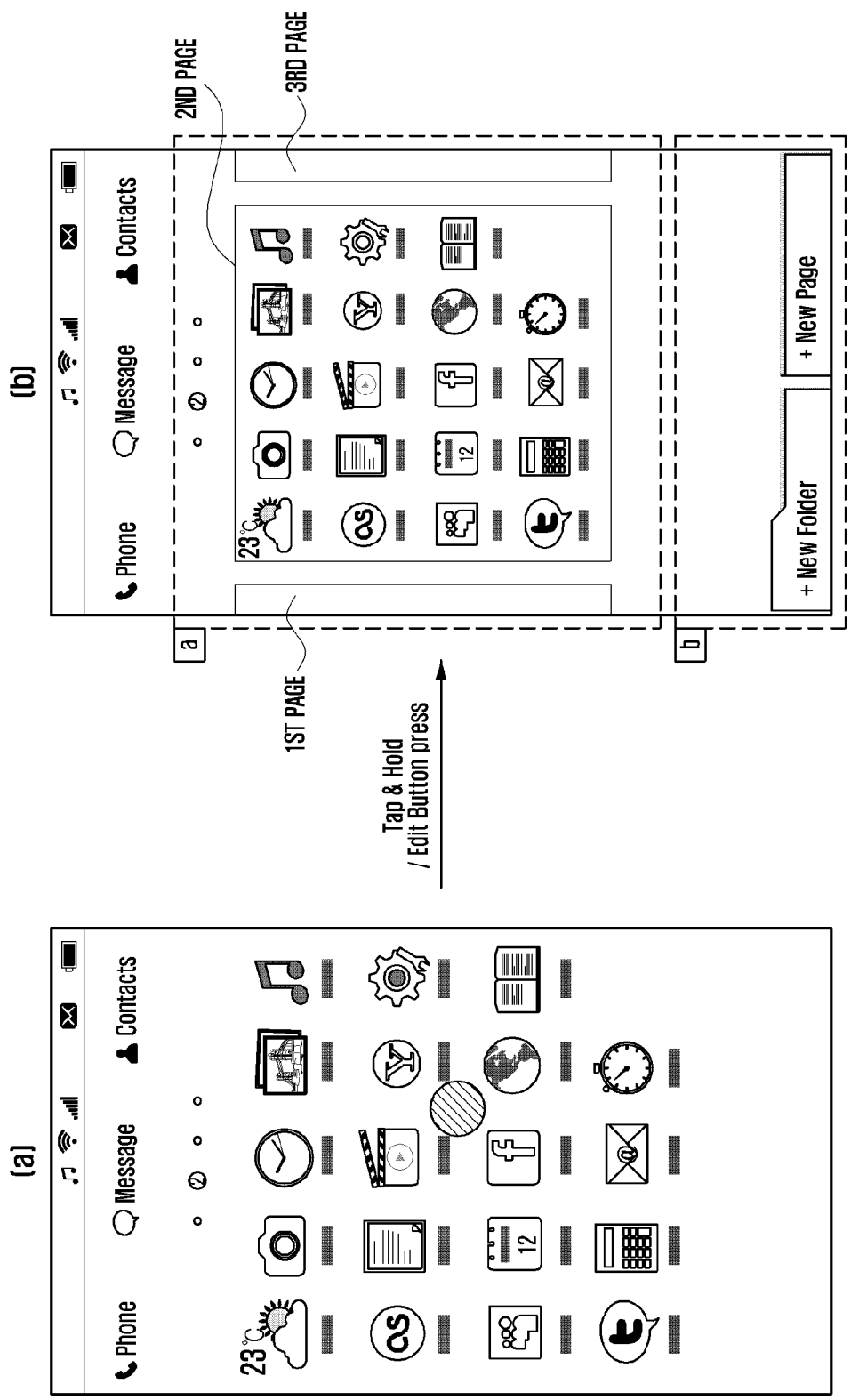
FIG. 5 is a screenshot illustrating examples of an idle screen and an edit screen displayed in a mobile device based on the screen editing method shown in FIG. 4.

FIG. 4 is a flow diagram illustrating exemplary operation of a method for editing a screen of a mobile device in accordance with an exemplary embodiment of the present invention. In addition, FIG. 5 is a screenshot illustrating examples of an idle screen and an edit screen displayed in a mobile device in the screen editing method shown in FIG. 4.

At (S405), after the mobile device 100 is turned on, the control unit 160 enters into the idle mode.

At (S410), the control unit 160 controls a display of the item display region having at least one item on the idle screen. An example of the idle screen is illustrated in [a] of FIG. 5.

Additionally, at (S415) the control unit 160 determines whether an input for entering into the edit mode is received. According to exemplary embodiments of the present invention, an input for entering into the edit mode may be a touch on a specific soft key, a press of an edit button, a long press (i.e., a tap and hold) more than given time on a specific item or region, a gesture, or the like. If there is no input for entering into the edit mode, then at (S420) the control unit 160 maintains the idle mode, or performs any other function requested by a user.

However, at if at (S415) an input for entering into the edit mode is received, then at (S425) the control unit 160 controls a display of the edit screen. Specifically, the control unit 160 displays the edit command region having at least one edit command on the edit screen. An example of the edit screen is illustrated in [b] of FIG. 5. Since the item display region is rearranged by means of page frames, a user can recognize that the edit mode is a current mode. As shown in [b] of FIG. 5, a frame of a current page (i.e., the second page) may be displayed together with a right part of a frame of a left page (i.e., the first page) and a left part of a frame of a right page (i.e., the third page).

At (S430), the control unit 160 determines whether or not an "item move" command is received. An item move command may be a touch and drag for a specific item, for example.

If at (S430) an item move command is received, then at (S435) the control unit 160 further determines whether a selected item is moved to the edit command region. Namely, the control unit 160 determines, for example, whether a selected item is dropped in the edit command region after being dragged. If a particular item move command is not a move command made toward the edit command region, then at (S460) the control unit 160 considers such an item move command as being a normal move command and then controls a selected item to be changed in position to a drop spot.

If the particular item move command is a move command made toward the edit command region, then at (S445) the control unit 160 checks a predetermined edit command assigned to the edit command region. An edit command may include, but is not limited to, a folder creation command, a page creation command, an item deletion command, or the like.

At (S450), the control unit 160 executes the checked edit command. Three examples in connection with (S450) will be described hereinafter.

Figure 6:
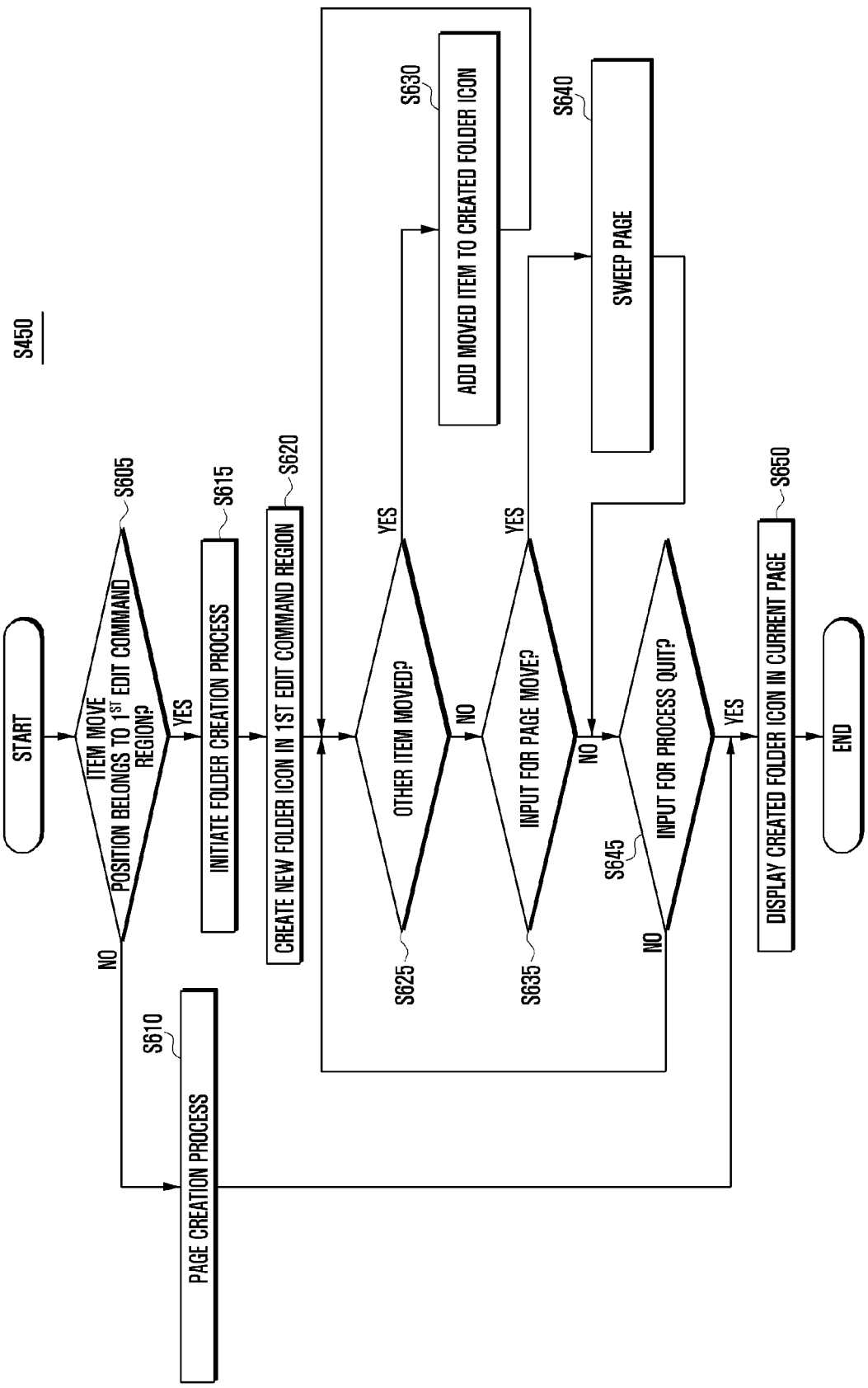
FIG. 6 is a flow diagram illustrating a process of creating a folder in the step S450 shown in FIG. 4.
Figure 7:
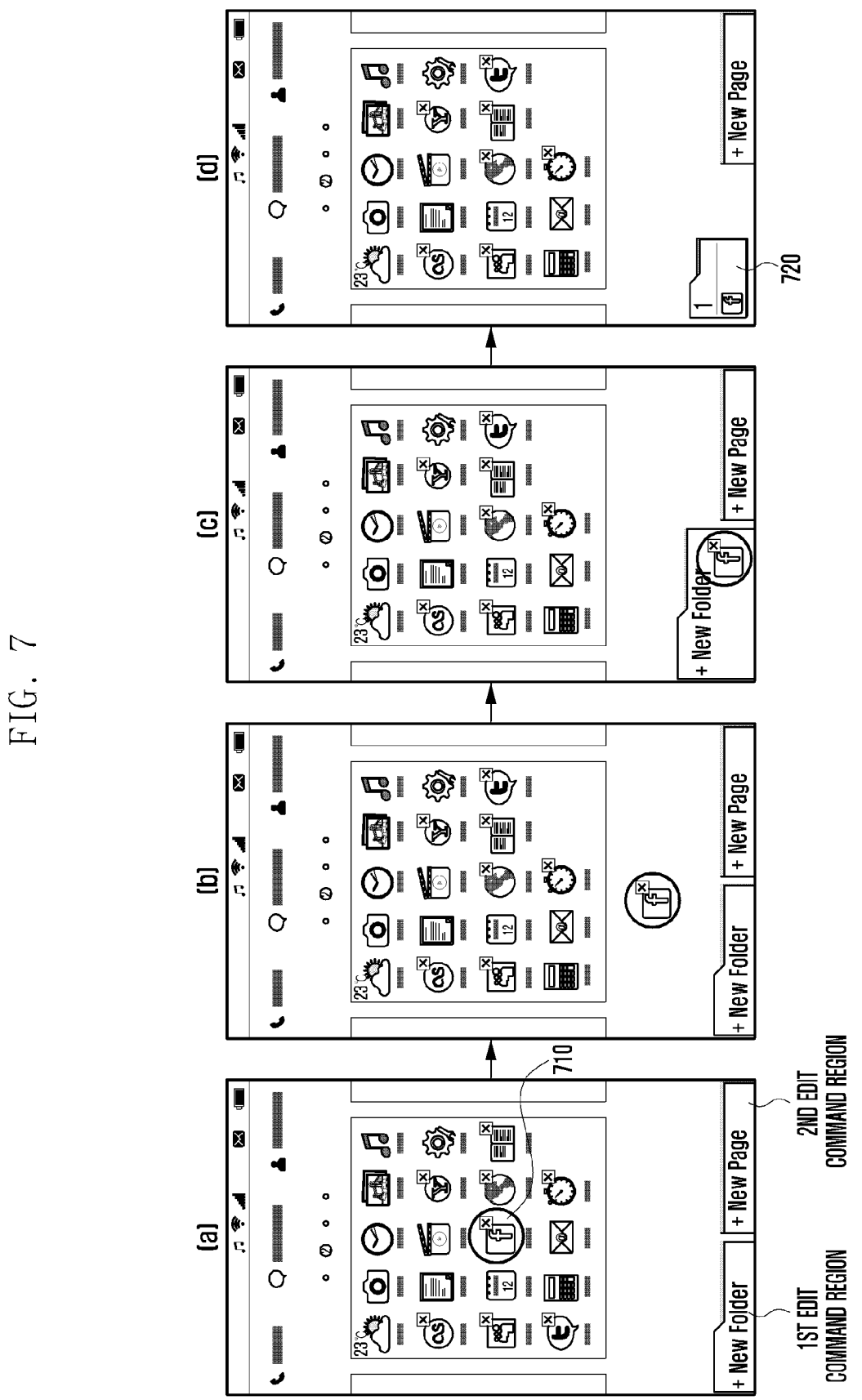
FIG. 7 is a screenshot illustrating examples of an idle screen and an edit screen displayed in a mobile device in the folder creation process shown in FIG. 6.

The first example of the three examples is a folder creation process and shown in FIGS. 6 and 7.

FIG. 6 is a flow diagram illustrating a process of creating a folder in step S450 shown in FIG. 4. And, FIG. 7 is a screenshot illustrating examples of an idle screen and an edit screen displayed in a mobile device in the folder creation process shown in FIG. 6.

At the outset, at (S605) the control unit 160 determines whether or not an item move position belongs to the first edit command region. If an item move position is not contained in the first edit command region, then at (S610) the control unit 160 performs a page creation process shown in FIG. 8.

If an item move position is contained in the first edit command region, at (S615) the control unit 160 initiates a folder creation process.

Namely, at (S620) the control unit 160 creates a new folder icon (720 shown in FIG. 7) in the first edit command region and then registers the moved item as a sub-item of the created folder. In this step, the control unit 160 may display an icon of the moved item in the created folder icon 720.

Then at (S625) the control unit 160 determines whether another item is further moved to the created folder icon 720. If any item is moved, at (S630) the control unit 160 adds the further moved item as a sub-item to the created folder. In this step, the control unit 160 may additionally display an icon of the further moved item in the created folder icon 720.

If no item is moved to the created folder icon 720, then at (S635) the control unit 160 further determines whether a page move command is inputted. A page move command may be a sweep gesture that a touch on a certain point is quickly dragged.

If a page move command is inputted, at (S640) the control unit 160 moves a current page of the edit screen in the direction of the move command.

However, at (S645) if there is no page move command, the control unit 160 determines whether or not a quit command of the folder creation process is inputted. If there is no quit command input at (S645), the control unit 160 returns to the aforesaid step (S625) and continues to perform the folder creation process.

However, if at (S645) a quit command is inputted, the control unit 160 displays the created folder icon 720 in a current page of the edit screen (S650). A quit command comprises, for example, sequentially input gestures of selecting and dragging the folder icon 720 and then dropping it at any spot in a current page.

Now, the above-discussed process shown in FIG. 6 will be described in detail through FIG. 7.

Stage [a] of FIG. 7 shows a step in which the edit screen is displayed in the edit mode and then a certain item 710 is selected. Stage [b] of FIG. 7 shows a step in which the selected item is dragged toward the first edit command region according to an item move command, namely a user's drag gesture.

Additionally, stage [c] of FIG. 7 shows a step in which the selected item is dragged and located in the first edit command region.

As shown, after any item is dragged in the first edit command region, the first edit command region may be enlarged and emphasized. Stage [d] of FIG. 7 shows a step in which the selected item is dropped in the first edit command region and then a new folder icon 720 is created in the first edit command region.

Thereafter, a user may quit the folder creation process by dragging and dropping the created folder icon 720 to any position on a current page of the edit screen. Alternatively, a user may sweep the edit screen right and left, select a page to which the created folder will be located, and perform a drag and drop to any position in the selected page. Therefore, a user can easily locate the created folder icon 720 on a desired page.

Figure 8:
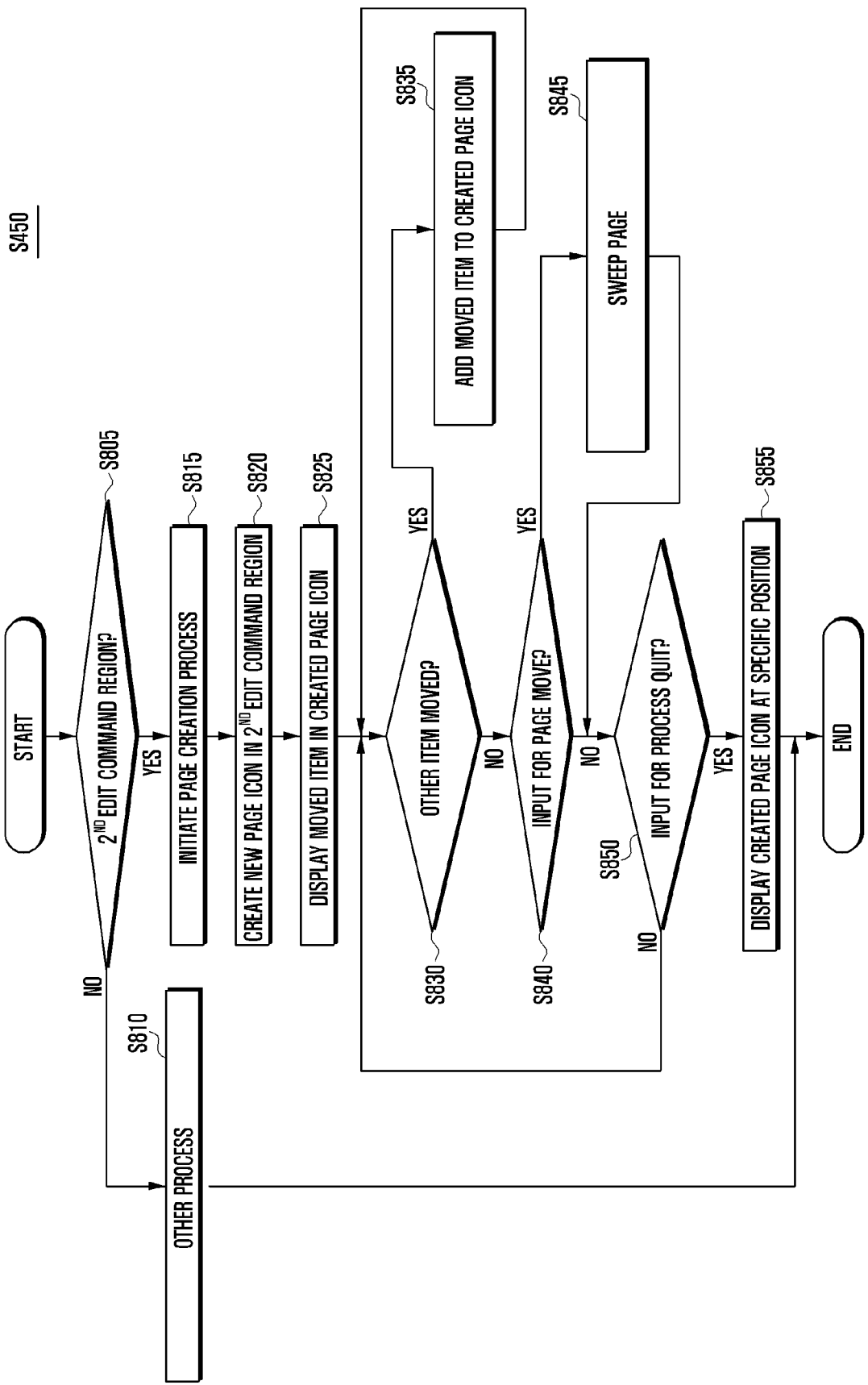
FIG. 8 is a flow diagram illustrating a process of creating a page in the step S450 shown in FIG. 4.

The second example is a page creation process and shown in FIGS. 8 and 9.

FIG. 8 is a flow diagram illustrating a process of creating a page in step (S450) shown in FIG. 4. In addition, FIGS. 9A and 9B are screenshots illustrating examples of an idle screen and an edit region displayed in a mobile device in the page creation process as shown in FIG. 8.

At the outset, at (S805) the control unit 160 determines whether a particular item move position belongs to the second edit command region. If the particular item move position is not contained in the second edit command region, then at (S810) the control unit 160 performs some other process, for example, shown in FIG. 10.

If at (S815), an item move position is contained in the second edit command region, the control unit 160 initiates a page creation process.

Namely at (S820), the control unit 160 creates a new page icon (920 shown in FIG. 9B) in the second edit command region and then registers the moved item as a sub-item of the created page. According to some exemplary embodiments, at (S825) the control unit 160 may display an icon of the moved item in the created page icon 920.

Then, at (S830) the control unit 160 determines whether or not any another item is additionally moved to the created page icon 920. If any item is moved, at (S835) the control unit 160 adds the further moved item as a sub-item in the created page. At this time, the control unit 160 may additionally display an icon of the additionally moved item in the created page icon 920.

If no item is moved to the created page icon 920, at (S840) the control unit 160 further determines whether or not a page move command is inputted.

If a page move command is inputted, then at (S845) the control unit 160 sweeps a current page of the edit screen in the direction of move command.

However, if at (S840) there is no page move command, then at (S850) the control unit 160 determines whether a quit command of the page creation process is inputted. If there is no quit command, the control unit 160 returns to the aforesaid (S830) and continues to perform the page creation process. However, if a quit command is inputted at (S850), then at (S855) the control unit 160 adds the created page at a specific position. A quit command may be sequential input gestures of selecting and dragging the page icon 720 and then dropping it at a specific position. This position is the location where the page icon is dropped, such as a space between two adjacent pages. For instance, as shown in [e] of FIG. 9B, if the page icon 920 is dropped between the second and third pages, a new page is created after the second page.

Now, the above-discussed process shown in FIG. 8 will be described in more detail through FIG. 9A-B.

A stage [a] of FIG. 9A shows a step in which the edit screen is displayed in the edit mode and then a certain item 910 is selected. A stage [b] of FIG. 9A shows a step in which the selected item is dragged toward the second edit command region according to an item move command, namely a user's drag gesture.

Additionally, a stage [c] of FIG. 9A shows a step in which the selected item is dragged and located in the second edit command region. As shown, after any item is dragged in the second edit command region, the second edit command region may be enlarged and emphasized. A stage [d] of FIG. 9 shows a step in which the selected item is dropped in the second edit command region and then a new page icon 920 is created in the second edit command region. Thereafter, a user may add any other item to the created page icon 920.

Next, a user drags the page icon 920 and drops page icon 920 on a space between the second and third pages as shown in a stage [e] of FIG. 9. Then, as shown in a stage [f] of FIG. 9, a new page is added after the second page.

Figure 10:
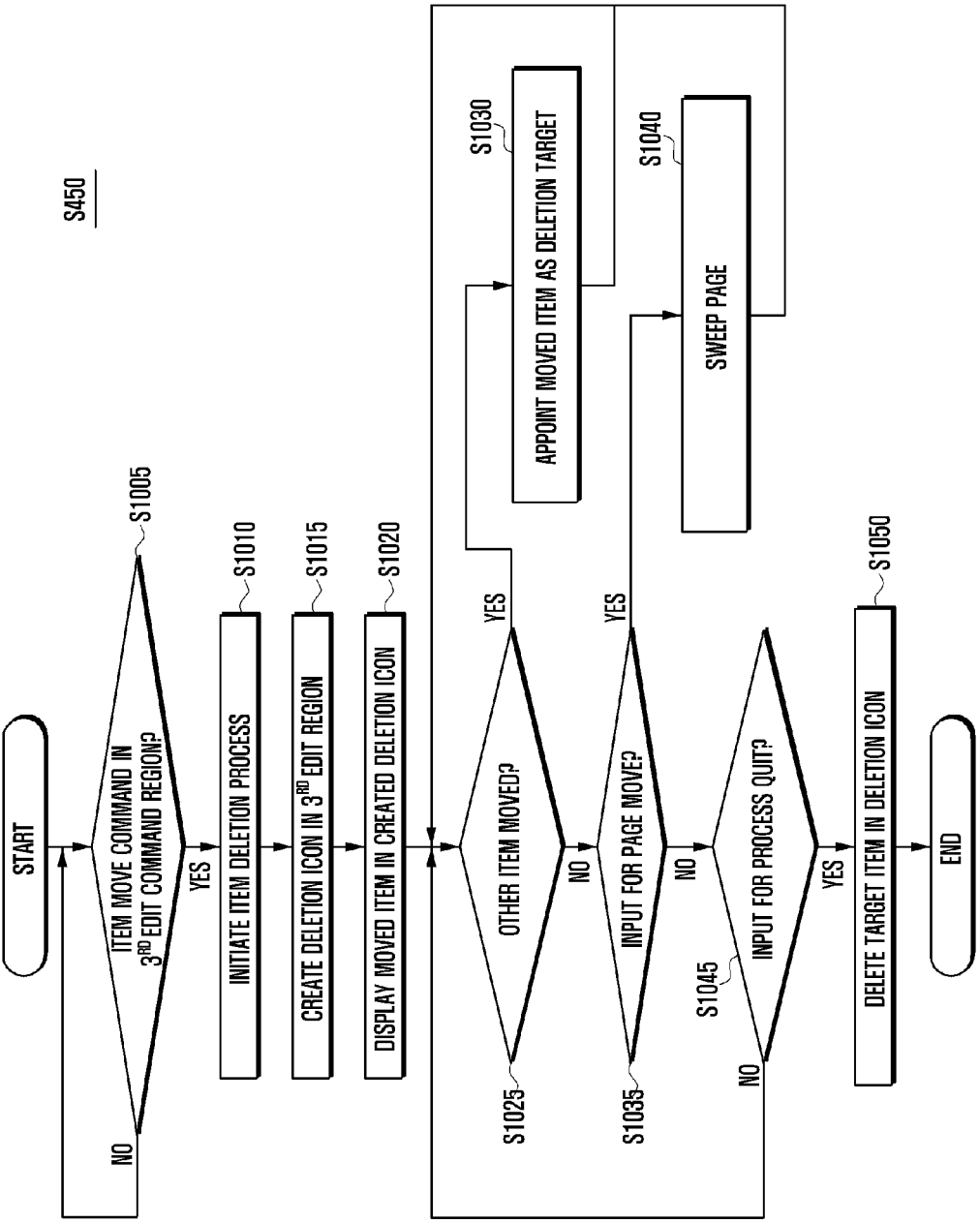
FIG. 10 is a flow diagram illustrating a process of deleting an item in accordance with another exemplary embodiment of the present invention.

FIG. 10 is a flow diagram illustrating a process of deleting an item in accordance with another exemplary embodiment of the present invention. Since examples of the idle screen and the edit screen displayed in the mobile device 100 according to this exemplary embodiment are similar to those of previously discussed embodiments, illustration thereof will be omitted herein.

At the outset at (S1005), the control unit 160 determines whether an item move position belongs to the third edit command region. If an item move position is contained in the third edit command region, then at (S1010) the control unit 160 initiates an item deletion process.

Namely, at (S1015) the control unit 160 creates a deletion icon in the third edit command region. According to some exemplary embodiments of the invention, the control unit 160 may display an icon of a moved item in the deletion icon (S1020).

Then at (S1025) the control unit 160 determines whether or not another item is also moved to the deletion icon. If any item is moved, at (S1030) the control unit 160 appoints the further moved item as a deletion target item.

If at (S 1025) no item is moved to the deletion icon, then at (S1035) the control unit 160 further determines whether a page move command is inputted. If at (S1040) a page move command is inputted, the control unit 160 moves a current page of the edit screen in the direction of the move command.

However, if there is no page move command, at (S1045) the control unit 160 determines whether a quit command of the item deletion process is inputted. If there is no quit command input, the control unit 160 returns to the aforesaid step (S1025) and continues to perform the item deletion process.

If a quit command is inputted, then at (S1050) the control unit 160 deletes target items contained in the deletion icon.

The above-described methods according to the present invention can be implemented in hardware, firmware or as software or computer code that can be stored in a recording medium such as a CD ROM, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method comprising:

displaying, in an idle mode, two regions comprising a first region and a second region having a predetermined size and containing one or more items, wherein the second region is adjacent to the first region;

in response to activating an edit mode, reducing the predetermined size of the first region and the one or more items contained therein in which the one or more items remain visible in a reduced size, and displaying a third region having a command object and visually distinguished from the first region and the second region by being spaced apart from the first region and the second region;

in response to detecting movement of one item of the one or more items from the first region to the command object of the third region, executing a command assigned to the command object regarding the one item, wherein when the third region includes a folder creation command, creating a new folder icon in the third region when one item of the one or more items in the first region is moved to the third region;

registering and displaying the first item moved from the first region as a sub-item of the created folder icon; and when a quit command is detected, displaying of the created folder icon in a current page of an edit screen.

2. The method of claim 1, wherein in the edit mode the first region is displayed with only a single frame of a current page in its entirety.

3. The method of claim 1, wherein a visual characteristic of the command object of the third region changes when the one item of the one or more items is moved to the command object of the third region.

4. The method according to claim 3, wherein the visual characteristic of the command object of the third region changes during the execution of the one item moved to the command object of the third region.

5. The method of claim 1, wherein a visual boundary is displayed between the first region and the third region in the edit mode.

6. The method of claim 1, wherein a first visual boundary is displayed between the first region and the third region, and a second visual boundary is displayed between the first region and the second region in the edit mode.

7. The method of claim 1, wherein in the edit mode the predetermined size of the second region is maintained.

8. The method of claim 1, wherein the command object comprises item deletion command object.

9. An electronic device comprising:

a display unit; and a control unit configured to:

control the display unit to display, in an idle mode, two regions comprising a first region and a second region having a predetermined size and containing one or more items, wherein the second region is adjacent to the first region;

in response to activating an edit mode, reduce the predetermined size of the first region and the one or more items contained therein in which the one or more items remain visible in a reduced size, and control the display unit to display a third region having a command object and visually distinguished from the first region and the second region by being spaced apart from the first region and the second region; and in response to detected movement of one item of the one or more items from the first region to the third region, execute a command assigned to the command object regarding the one item, wherein when the command object includes a folder creation command, a new folder icon is created in the third region in response to the one item being moved to the third region;

wherein the one item is a sub-item of the created folder icon; and in response to receiving a quit command, the created folder icon is displayed in a current page of an edit screen.

10. The electronic device of claim 9, wherein in the edit mode a size of the first region is displayed with only a single frame of a current page in its entirety.

11. The electronic device of claim 9, wherein a visual characteristic of the command object of the third region changes when the one item of the one or more items is moved to the command object of the third region.

12. The electronic device of claim 11, wherein the visual characteristic of the command object of the third region changes during the execution of the one item moved to the command object of the third region.

13. The electronic device of claim 9, wherein a visual boundary is displayed between the first region and the third region in the edit mode.

14. The electronic device of claim 9, wherein a first visual boundary is displayed between the first region and the third region, and a second visual boundary is displayed between the first region and the second region in the edit mode.

15. The electronic device of claim 9, wherein in the edit mode the predetermined size of the second region is maintained.

16. The electronic device of claim 9, wherein the command object comprises item deletion command object.

* * * * *